United States Patent [19]

Bishop, III

[11] 4,224,191

[45] Sep. 23, 1980

[54] HIGH-COPPER-LEVEL COMULLED SULFUR SORBENT

[75] Inventor: Keith C. Bishop, III, San Rafael, Calif.

[73] Assignee: Chevron Research Company, San Francisco, Calif.

[21] Appl. No.: 17,782

[22] Filed: Mar. 5, 1979

[51] Int. Cl.$^2$ .................... B01J 21/04; B01J 23/72
[52] U.S. Cl. ................................ 252/463; 423/244 R
[58] Field of Search ............... 252/463; 423/244 R, 423/628

[56] References Cited

U.S. PATENT DOCUMENTS

| | | | |
|---|---|---|---|
| 2,768,932 | 10/1956 | Richard et al. | 208/246 X |
| 2,897,142 | 7/1959 | Jacobs et al. | 208/212 |
| 3,403,111 | 9/1968 | Colgan et al. | 252/463 X |
| 3,776,854 | 12/1973 | Dautzenberg et al. | 252/463 X |
| 3,894,963 | 7/1975 | Gerdes et al. | 252/463 X |

*Primary Examiner*—W. J. Shine
*Attorney, Agent, or Firm*—D. A. Newell; R. H. Davies; R. H. Evans

[57] ABSTRACT

A porous sulfur sorbent, especially useful for removing residual H$_2$S and mercaptans from reformer feed streams, prepared by peptizing an alumina with acid, mulling the peptized alumina with a copper compound to form an extrudable dough, extruding the dough, and drying and calcining the extrudate.

9 Claims, No Drawings

HIGH-COPPER-LEVEL COMULLED SULFUR SORBENT

FIELD OF THE INVENTION

An improved comulled sulfur sorbent is disclosed which has principal use in eliminating residual sulfur from conventionally desulfurized reformer or isomerization feed streams.

PRIOR ART

Catalytic reforming processes play an integral role in upgrading straight-run or cracked naphtha feedstocks. These processes have become particularly important in recent years due to increased demand for low-lead and unleaded gasolines.

In a typical modern reforming process, a straight-run or cracked naphtha feed, having a boiling range from about 20°–290° C., preferably 65°–235° C., is passed over a promoted noble metal catalyst on alumina at a temperature in the range of 315°–595° C., preferably 370°–565° C., a pressure in the range from atmospheric to 70 atmospheres, at a liquid hourly space velocity in the range 0.1–10, preferably 1–5, and a hydrogen to hydrocarbon mol ratio in the range 1–10. Variations in the conditions will depend in large measure upon the type of feed processed, such as whether the feed is aromatic, paraffinic or naphthenic, and the desired increase in octane levels. (See U.S. Pat. No. 4,082,697).

To achieve maximum run lengths and increased process efficiency, it is generally recognized that the sulfur content of the feedstock must be minimized to prevent poisoning of the catalyst. Preferably the feed will contain less than 2–10 parts per million by weight sulfur, since the presence of sulfur in the feed decreases the activity and the stability of the catalyst (see U.S. Pat. No. 3,415,737).

A common method of treating reformer feeds to reduce sulfur content is the hydrodesulfurization process, wherein the naphtha is contacted with a sulfur-resistant hydrogenation catalyst in the presence of hydrogen. Catalysts for this service normally comprise Group VIB and/or Group VIII metals on refractory supports, such as molybdenum and cobalt metals, their oxides or sulfides, on alumina. The sulfur in the feed stream is converted to hydrogen sulfide, which may be separated from the naphtha by conventional means prior to reforming. Although good sulfur removal may be achieved by hydrodesulfurization units operating under severe conditions, the process is ultimately limited by the physical and chemical equilibrium concentration of hydrogen sulfide and mercaptans in the treated liquid feed.

If as little as 1.5 parts per million by weight of $H_2S$ remain in the reformer recycle hydrogen stream, the run length will be decreased by as much as 50%, $C_5+$ yields will be decreased by 1.5 liquid volume percent, and hydrogen yields decreased accordingly. Thus, there exists a very strong economic incentive to remove substantially all sulfur from the reformer feed stream.

The prior art teaches that various metals and particularly those of Group IB, such as copper and silver, may be used for the desulfurization of naphtha feed streams. For example, W. L. Jacobs in U.S. Pat. No. 2,897,142, which is incorporated herein by reference, discloses that a bed of copper pellets may be placed after a conventional hydrodesulfurization unit to reduce sulfur levels in naphthas. The prior art also teaches in U.S. Pat. No. 3,776,854, which is incorporated herein by reference, that sulfur oxides may be removed from waste gases with an acceptor prepared by impregnating an alumina support with a copper compound. See also U.S. Pat. No. 2,768,932.

In order to impregnate copper into a preformed support, it is usually necessary to start with a soluble copper salt, such as copper nitrate or copper sulfate. The salt is dissolved in an aqueous medium and the support carrier immersed therein. Upon calcination and thermal activation of the impregnated support, however, objectionable nitrous and/or sulfur oxides are driven off, which create air pollution problems during manufacture. Furthermore, the metals content which can be impregnated upon the support is economically limited to approximately 14% by weight, since further increases in copper loading do not result in a proportional beneficial effect.

A new copper sorbent has been discovered, however, which is considerably more active and which has more capacity for the absorption of sulfur than the sorbent of the prior art. This activity is particularly surprising and unexpected since the sorbent of the present invention has the copper "imbedded" in the walls of an alumina support rather than coating the support surface. Furthermore, the new sorbent may be prepared by a process which eliminates the impregnation step of the prior art.

SUMMARY OF THE INVENTION

The present invention relates to a novel sulfur sorbent which is prepared by peptizing an alumina with an acid such as hydrochloric acid, nitric acid, formic acid, acetic acid or propionic acid; mulling the peptized alumina with a copper compound to form an extrudable dough; extruding the dough; and drying and calcining the extrudate. The copper compound selected may comprise copper nitrate, copper oxide, copper chloride, or copper chromite, and preferably comprises copper carbonate. The alumina is preferably predominantly comprised of alpha alumina monohydrate. Sufficient amounts of the copper compound are preferably added to the peptized alumina such that the final extrudate will have a copper content, based upon the metal, in excess of 14 weight percent. The final extrudate preferably has a copper content, based upon the metal, of 14–75 weight percent and more preferably 14–40 weight percent and a corresponding alumina content of 60–86 weight percent. The sulfur sorbent has a pore volume in the range of from about 0.5 to 0.9 cubic centimeters per gram and has at least 75, preferably 85 percent of said pore volume in pores having a diameter between 40 and 200 Angstroms.

DETAILED DESCRIPTION OF THE PREFERRED EMBODIMENTS

The present invention relates to an improved high-capacity sulfur sorbent, which is particularly useful for removing residual quantities of sulfur from previously hydrodesulfurized and/or hydrocracked reformer feed streams. The novel sorbent is prepared by acid peptizing alumina and comulling a copper compound therewith in effective quantities, extruding the comulled mixture and calcining the extrudate.

Hydrodesulfurization units typically will reduce sulfur content in high-sulfur feeds to about 1 to 5 parts per million. Residual sulfur levels of this magnitude, however, still have a deleterious effect on reformer run lengths between catalyst regeneration and thus increase the cost of transportation fuel production. The sorbent of the present invention may be used under moderate temperature and pressure conditions to eliminate the remaining sulfur, present as H$_2$S or mercaptans, and since the sorbent of the present invention has a high capacity and will be used primarily for low-sulfur-content feeds, the sorbent may be produced on a disposable basis, thus eliminating costly regeneration equipment.

Prior art sorbents produced by impregnating alumina supports with copper compounds are not as active and do not have the capacity per unit of metal of sorbents produced in accordance with the present invention.

Sulfur loading or capacity appears to be proportional to copper levels in the sorbent up to about 14 weight percent copper. For example, the sulfur capacity of a 7-weight-percent impregnated sorbent is approximately one-half the capacity of a 14-weight-percent impregnated sorbent. Beyond 14 weight percent, however, additional impregnated copper gives less than the respective proportional capacity increase. In fact, 20% copper sorbents made by a single impregnation step were observed to actually have less capacity than 14-weight-percent impregnated copper sorbents. This anomaly is believed to be the result of copper deposits obstructing the alumina support pores.

Comulled sorbents made in accordance with the present invention, however, are not limited to the 14-weight-percent copper levels of the single-step impregnated catalyst. Tests made thus far have shown that comulled copper sorbents having up to 36% copper by weight are proportionally capacitive to sorbents of lower copper content. Thus, comulled sorbents may be prepared which have capacities at least 2½ times as great as impregnated sorbents.

To compare the activities and capacities of copper-impregnated sorbent with comulled copper sorbents, hydrofined naphthas, boiling in the range of about 80° C. to 200° C. and having a sulfur content of approximately 16 parts per million by weight, were passed over beds of the respective sorbents at a pressure of 14.6 atmospheres.

The copper doubly impregnated sorbent was prepared by immersing a calcined alumina extrudate in a solution of copper nitrate, and drying and calcining the impregnated extrudate to make the finished sorbent. The sorbent had a copper content of 30 weight percent and had the pore characteristics shown in the table below.

The comulled copper sorbent was prepared by peptizing a commercial alumina powder with 3 weight percent nitric acid, and mulling the peptized base with copper carbonate for approximately 1 hour. The comulled mixture was extruded, dried and calcined and had a copper content of 30 weight percent. Pore characteristics of the comulled sorbent are also shown in the table below for comparison with the measured pore distributions of the copper-impregnated catalyst.

The comulled copper sorbent bed was operated at a temperature of approximately 82° C. and the impregnated copper sorbent bed was operated at a temperature of approximately 93° C. to attain the equivalent activity.

Measurable sulfur levels in the effluent from the copper-impregnated bed appeared after approximately 160 hours of operation and appeared in the comulled bed effluent after approximately 200 hours, thus clearly indicating a superior run length. The increased capacity of the comulled sulfur sorbent for sulfur loading was also observed by measuring the sulfur content of the respective sorbents at the end of each run. For test purposes, the end of the run was defined to coincide with a 20% breakthrough of the inlet feed sulfur through the bed. The comulled sulfur sorbent had absorbed approximately 8.5 weight percent sulfur, but the impregnated sorbent had absorbed only 4.31 weight percent sulfur. Thus, from the sulfur loadings, the copper of the comulled sorbent appears to be almost twice as effective as the copper of the impregnated sorbents for sulfur removal.

The type of alumina used for the comulled catalyst base does not appear to be critical. Although the preferred support will be comprised primarily of alumina, the support may also contain other materials, such as silica, for example, to impart additional strength thereto. Various peptizing agents such as propionic acid, nitric acid, hydrochloric acid and sulfuric acid may be used, although nitric acid is preferred. Similarly, a number of copper compounds may be mulled with the peptized alumina such as copper oxide, copper nitrate and copper carbonate, although copper carbonate is preferred since the carbonate decomposes to the oxide upon calcination without releasing atmospheric pollutants. The mixture of acid, alumina and copper compounds should have a volatiles content in the range of 50–60 weight percent, and preferably 54–56 weight percent, for good extrusion consistency. After extrusion, the extrudates are preferably dried at a temperature of 125° C. for 2 hours prior to calcining at 500° C. for 2 hours. The final temperature of calcination may vary, depending upon the type of copper compound used in the extrudate preparation.

TABLE

| | Impregnated Sorbent | Comulled Sorbent |
| --- | --- | --- |
| Total pore volume, ml/gm | 0.352 | 0.613 |
| Macropore volume, ml/gm | 0.075 | 0.030 |
| Micropore volume, ml/gm | 0.277 | 0.583 |
| Total surface area, m$^2$/gm | 129.85 | 210.45 |
| Macro surface area, m$^1$/gm | 0.74 | 0.45 |
| Micro surface area, m$^2$/gm | 129.11 | 210.0 |
| Geometric macropore diameter, A. | 4059 | 2684 |
| Geometric micropore diameter, A. | 85.90 | 111.06 |

The pore volumes referred to above were determined by conventional mercury porisimetry techniques. The surface tension of the mercury was taken as 473 dynes per centimeter at 25° C. and a contact angle of 2.443461 radians was used. The "geometric pore diameters" were calculated assuming cylindrical-shaped pores and the division between micropores and macropores was set at 1000 Angstroms.

What is claimed is:

1. A porous sulfur sorbent, prepared by the process which comprises:
    peptizing an alumina with acid; mulling the peptized alumina with a copper compound to form an extrudable dough; extruding the dough; and drying and calcining the extrudate.

2. A porous sulfur sorbent as recited in claim 1, wherein said acid is an acid selected from the group consisting of formic acid, nitric acid, acetic acid, propionic acid, and hydrochloric acid.

3. A porous sulfur sorbent as recited in claim 1, wherein said copper is a copper compound selected from the group consisting of copper carbonate, copper oxide, and copper nitrate.

4. A porous sulfur sorbent as recited in claim 1, wherein said extrudate is calcined at a temperature of 500° C.

5. A porous sulfur sorbent as recited in claim 1, wherein said alumina is predominantly comprised of an alpha-alumina monohydrate.

6. A porous sulfur sorbent as recited in claim 1, wherein said calcined extrudate has a copper content of at least 14 weight percent based upon the metal.

7. A porous sulfur sorbent as recited in claim 1, wherein said extrudate has a copper content of at least 20 weight percent based upon the metal.

8. A porous sulfur sorbent which comprises: 14-75 weight percent copper, based upon the metal; 60-86 weight percent alumina; said sorbent having a pore volume in the range from about 0.5 to 0.9 cubic centimeters per gram and having at least 75% of said pore volume in pores having a diameter between 40 and 200 Angstroms.

9. A porous sulfur sorbent as recited in claim 8, wherein said sorbent comprises 14-40 weight percent copper and at least 85% of said pore volume is in pores having a diameter between 40 and 200 Angstroms.

* * * * *